(12) United States Patent
Bowen et al.

(10) Patent No.: US 7,448,289 B1
(45) Date of Patent: Nov. 11, 2008

(54) MANUAL TRANSMISSION

(75) Inventors: Thomas Christopher Bowen, Rochester Hills, MI (US); Marius Octavel Enache, LaSalle (CA)

(73) Assignee: Dymos Co., Ltd., Farmington Hills, MI (US)

( * ) Notice: Subject to any disclaimer, the term of this patent is extended or adjusted under 35 U.S.C. 154(b) by 139 days.

(21) Appl. No.: 11/210,369

(22) Filed: Aug. 24, 2005

(51) Int. Cl.
*F16H 3/08* (2006.01)
(52) U.S. Cl. ....................................................... 74/331
(58) Field of Classification Search ................... 74/325, 74/329, 331; 403/111
See application file for complete search history.

(56) References Cited

U.S. PATENT DOCUMENTS

| | | | | |
|---|---|---|---|---|
| 3,978,935 A | * | 9/1976 | Dauwalder | 180/9.62 |
| 5,044,215 A | * | 9/1991 | Watanabe | 74/329 |
| 5,370,014 A | * | 12/1994 | Pigozzi et al. | 74/331 |
| 5,546,823 A | * | 8/1996 | Stine et al. | 74/331 |
| 5,946,970 A | * | 9/1999 | Fraley et al. | 74/325 |
| 6,591,705 B1 | | 7/2003 | Reik et al. | |
| 6,718,841 B1 | | 4/2004 | Schepperle | |

* cited by examiner

*Primary Examiner*—Charles A Marmor
*Assistant Examiner*—Derek D Knight
(74) *Attorney, Agent, or Firm*—David C. Purdue; John C. Purdue

(57) ABSTRACT

A manual transmission includes an input shaft operatively connected to a source of motive power and a countershaft in axially parallel relationship with the input shaft. The manual transmission also includes an output shaft in axially parallel relationship with the counter shaft. The manual transmission further includes a plurality of gear set pairs disposed between the input shaft and the counter shaft such that the gear sets provide different gear ratios for transferring torque from the input shaft to the output shaft, each of the gear sets including a driver gear operatively supported by the input shaft such that the driver gear receives only torque from the source of motive power.

16 Claims, 2 Drawing Sheets

MANUAL TRANSMISSION

BACKGROUND OF THE INVENTION

1. Field of the Invention

The present invention relates generally to manual transmissions and, more particularly, to a manual transmission for a vehicle.

2. Description of the Related Art

Generally speaking, land vehicles require three basic components. These components comprise a power plant (such as an internal combustion engine), a power train, and wheels. The internal combustion engine produces force by the conversion of chemical energy in a liquid fuel into the mechanical energy of motion (kinetic energy). The function of the power train is to transmit this resultant force to the wheels to provide movement of the vehicle.

The power train's main component is typically referred to as the "transmission". Engine torque and speed are converted in the transmission in accordance with the tractive-power demand of the vehicle. The vehicle's transmission is also capable of controlling the direction of rotation being applied to the wheels, so that the vehicle may be driven both forward and backward.

It is known to provide a manual transmission for a vehicle such as a truck. The manual transmission typically includes an input shaft, a counter shaft, and an output shaft, and a plurality of gear set pairs that selectively provide various gear ratios, or relationships between the input and output shafts. The output shaft is in meshed engagement with the counter shaft with the gear set pairs operatively disposed between the input shaft and the counter shaft. Typically, driver gears of the gear set pairs are mounted to the counter shaft and a headset is disposed prior to the gear set pairs. Additionally, in transmissions for trucks and other heavy utility vehicles, the conventional manual transmissions are designed with greater numbers of gear ratios and gear sets. This requires a plurality of synchronizers to selectively engage respective gears to the counter shaft.

One disadvantage of this conventional approach to truck and heavy vehicle transmissions is that all of the driver gears are placed on the counter shaft and the headset increases torque on the counter shaft. As a result, the driver gears on the counter shaft receive increased load, necessitating the driver gears to be relatively large in size for the necessary strength. Another disadvantage is that all the synchronizer controlled gears on only one of the shafts requires a large axial length to include all the operative parts and accommodate the axial room necessary to move the synchronizers in and out of engagement. Further, the long axial length of the shafts either requires additional bearings for support or causes the end bearings to be separated over the length of the shafts. Adding intermediate bearings along the shafts to compensate further adds to overall shaft length. Conversely, a long shaft length without intermediate bearing support causes the shafts to be subject to bending and deflection. If this possible bending is countered by strengthening the shafts, then all the components will have additional size, weight, and associated cost. Furthermore, long shafts resulting from the placement of all of the synchronized gears on one shaft requires that very strong shifting forces have to be applied to engage the gear pairs.

In addition, many applications in trucks and other heavy vehicles require a power take-off as a source of motive power for any number of various power driven attachments and accessories that may be connected to the transmission or the vehicle. In providing a power take-off, the transmissions of the prior art have generally employed separate power take-off shafts that interconnect to the drive gears or assemblies within the transmission. However, the addition of a separate shaft requires a number of additional components that add to the size, weight, and complexity of the transmission.

Therefore, it is desirable to provide a new manual transmission for a vehicle that provides all driver gears on an input shaft to receive only engine torque. It is also desirable to provide a manual transmission that reduces the number of parts, the size of the transmission, and the cost. It is further desirable to provide a manual transmission that includes a power take-off that is integrated into the transmission and does not require a separate power take-off shaft. Therefore, there is a need in the art to provide a manual transmission that meets these desires.

SUMMARY OF THE INVENTION

Accordingly, the present invention is a manual transmission. The manual transmission includes an input shaft operatively connected to a source of motive power. The manual transmission also includes a countershaft in axially parallel relationship with the input shaft. The manual transmission includes an output shaft in axial parallel relationship with the countershaft. The manual transmission also includes a plurality of gear set pairs disposed between the input shaft and the output shaft such that the gear sets provide different gear ratios for transferring torque from the input shaft to the output shaft. Each gear set includes a driver gear operatively supported by the input shaft such that the driver gear receives only torque from the source of motive power.

Additionally, the present invention is a manual transmission including an input shaft operatively connected to a source of motive power and having a first reverse/power take-off gear and a countershaft having a first output gear and a reverse output gear. The countershaft is in axially parallel relationship with the input shaft. The manual transmission also includes a plurality of meshingly engaged gear set pairs, each gear set pair including a first and a second gear. The gear set pairs are disposed upon the input shaft and the counter shaft, the first gear of each gear set pair is fixedly mounted to its respective shaft and the second gear of each gear set pair is adapted to rotate freely about its respective shaft. The manual transmission further includes a plurality of synchronizers disposed upon the input shaft and countershaft, each synchronizer being adapted to selectively engage the freely rotatable gear of each gear set pair to its respective shaft. The manual transmission includes an output shaft in axial parallel relationship with the countershaft that has a second output gear in meshing engagement with the first output gear of the countershaft. The manual transmission further includes a secondary shaft that is axially parallel to the input shaft and countershaft. The secondary shaft has a second reverse/power takeoff gear in meshing engagement with the first reverse/power take-off gear of the input shaft, and a reverse idler gear in meshing engagement with the reverse output gear of the countershaft.

One advantage of the present invention is that a manual transmission is provided having all of the driver gears on the input shaft to receive only engine torque, resulting in less torque on the driver gears, smaller size driver gears, and quieter operation of the transmission. Another advantage of the present invention is that the manual transmission incorporates synchronizers on both the input and the countershaft, allowing for shorter shafts that are properly supported within a transmission housing and reduces the number of parts, size, and weight of the transmission. Yet another advantage of the present invention is that the manual transmission has a secondary shaft that provides both power take-off output and a reverse gear for the transmission, again, reducing the number of parts, size, and weight of the transmission. A further advantage of the present invention is that the manual transmission provides a reduction in a number of components and the size of the transmission is less costly.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
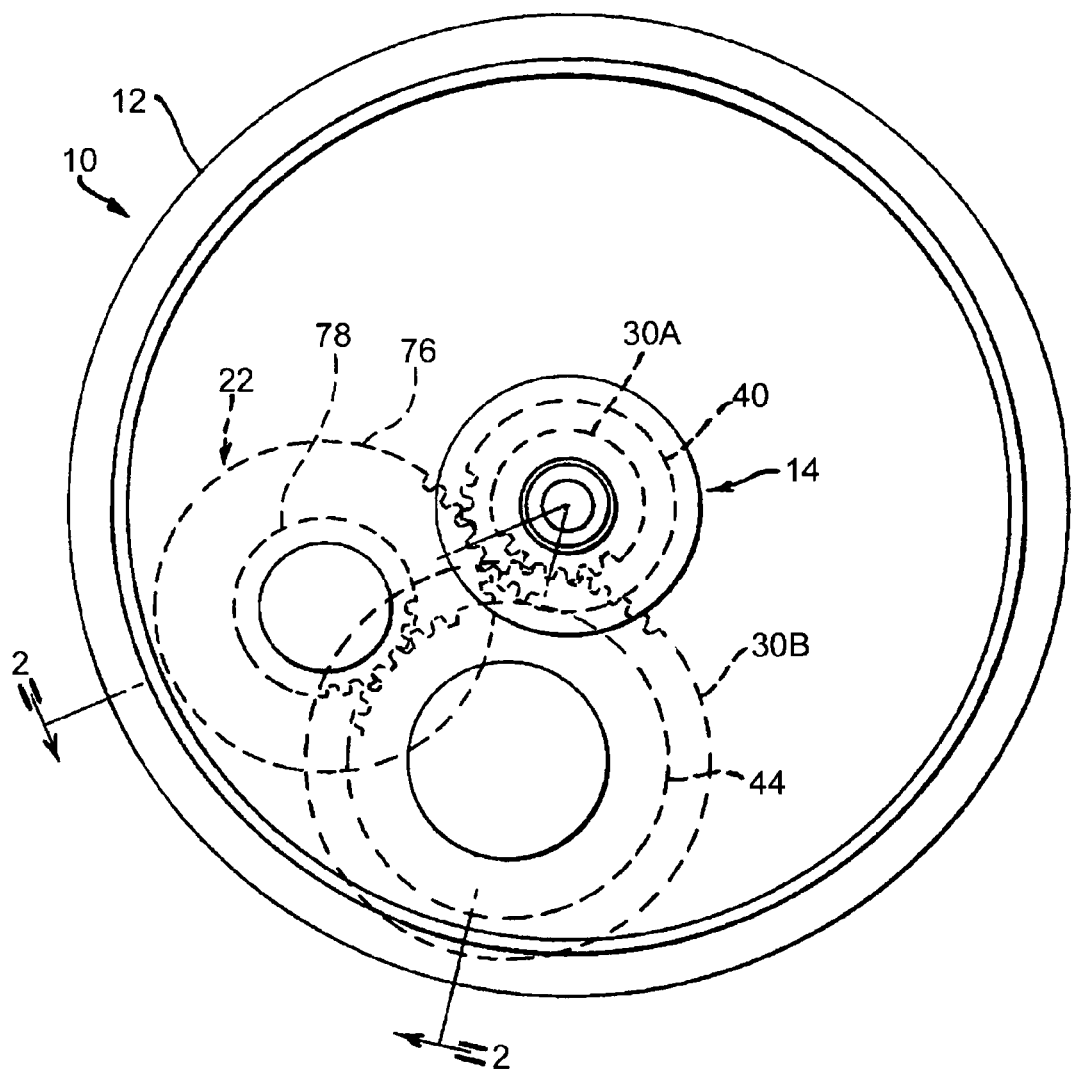
FIG. 1 is a front end view of a manual transmission, according to the present invention.
Figure 2:
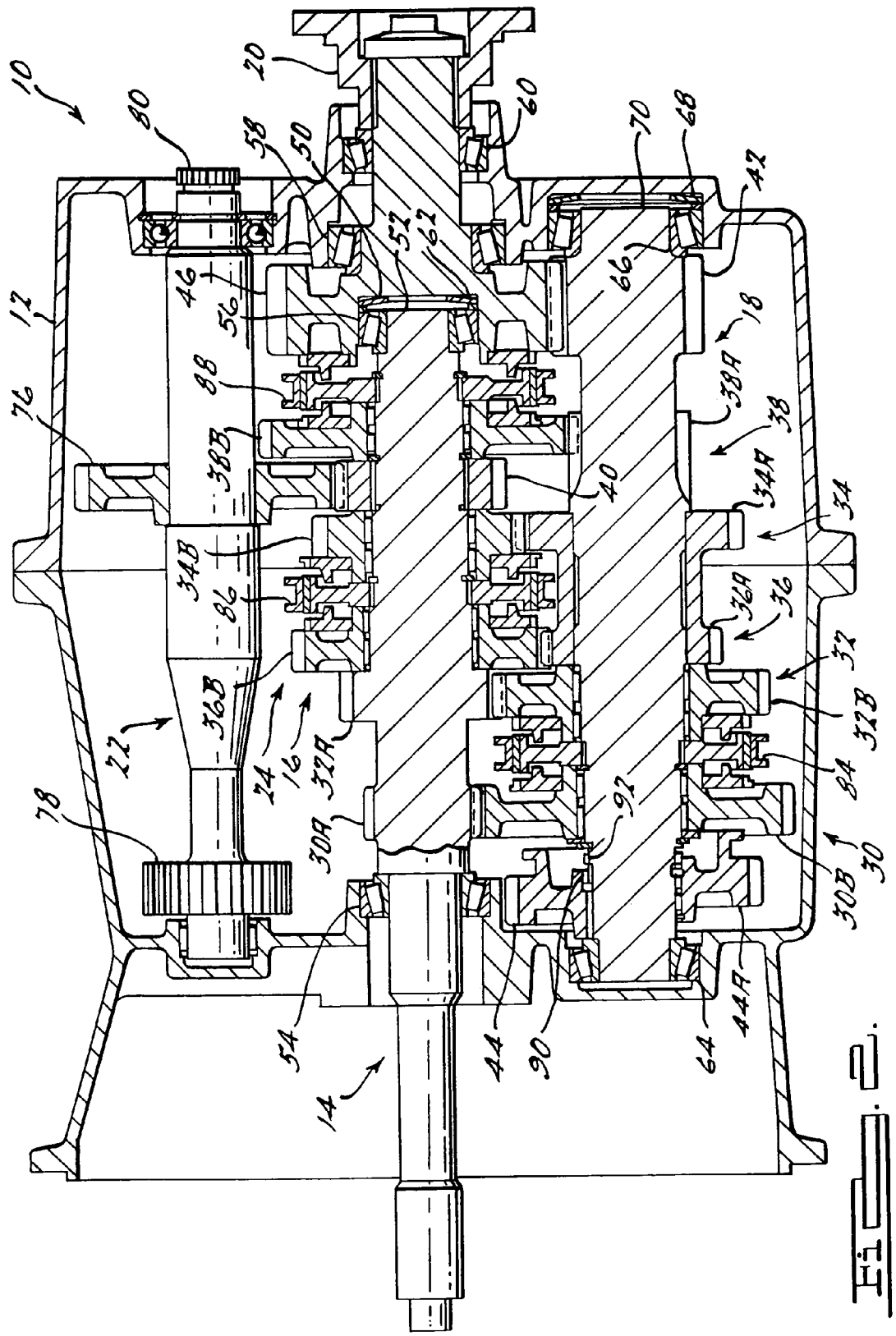
FIG. 2 is a side cross-sectional view taken along line 2-2 of FIG. 1.

Referring to FIGS. 1 and 2, one embodiment of a manual transmission 10, according to the present invention, is shown for a vehicle such as a truck (not shown). The manual transmission 10 includes a transmission housing or case 12 for enclosing the numerous subassemblies that make up the transmission 10. Specifically, the manual transmission 10 includes an input shaft, generally indicated at 14, a plurality of gear pairs, generally indicated at 16, a countershaft, generally indicated at 18, an output shaft 20, a secondary shaft, generally indicated at 22, and a plurality of synchronizers, generally indicated at 24.

The manual transmission 10 forms a portion of a vehicle powertrain and is responsible for taking a torque input from a prime mover such as an internal combustion engine and transmitting the torque through selectable gear ratios to the vehicle drive wheels. The manual transmission 10 operatively routes the applied torque from the engine through a clutch assembly (not shown) to the input shaft 14. Each pair of the gear set pairs 16 are meshingly engaged. In one embodiment, the manual transmission 10 has six forward speeds or gear ratios that are represented by five gear set pairs. Specifically, the first gear set pair is generally indicated at 30, the second gear set pair is generally indicated at 32, the third gear set pair is generally indicated at 34, the fourth gear set pair is generally indicated at 36, and the sixth gear set pair is generally indicated at 38. In the embodiment illustrated, fifth gear is a direct, or one-to-one, ratio that is accomplished by directly engaging the input shaft 14 to the output shaft 20, as will be discussed below.

The two gears of each gear set pair 16 are disposed upon the input shaft 14 and the countershaft 18. As illustrated in FIG. 1, a first gear of each gear set pair is fixedly mounted to its respective shaft and is represented in the gear set pair by the letter "A", such that 30A, 32A, 34A, 36A, and 38A are all fixed to their respective shaft. A second gear of each gear set pair is adapted to rotate freely about its respective shaft and is represented by the letter "B", such that 30B, 32B, 34B, 36B, and 38B are free to rotate about their respective shaft. Thus, the gear set pairs 30 through 38 operatively provide the different gear ratios sets used for transferring torque from the input shaft 14 to the output shaft 20. The input shaft 14 also includes a first reverse/power take-off gear 40 to be discussed. In the embodiment illustrated, the driver gears are all mounted to or operatively supported by the input shaft 14. Specifically, gears 30A, 32A, 36B, 34B, and 38B are mounted to the input shaft 14 and are driver gears that rotate the counter shaft 18 when engaged. It should be appreciated that the driver gears receive only engine torque, which is received by the input shaft 14.

The countershaft 18 is in axially parallel relationship with the input shaft 14 and has a first output gear 42 and a reverse output gear 44. The synchronizers 24 are disposed upon the input shaft 14 and the countershaft 18. Each synchronizer 24 is adapted to selectively engage the freely rotatable gear of each gear set pair 16 to its respective shaft.

The output shaft 20 is in axially parallel relationship with the countershaft 18 and has a second output gear 46 in meshing engagement with the first output gear 42 of the countershaft 18. The output shaft 20 provides the output torque to the remainder of the powertrain. To provide space savings and size reduction, the output shaft 20 is coaxial to the input shaft 14. More specifically, the output shaft 20 includes a recessed end 50 that receives the rear end 52 of the input shaft 14.

The input shaft 14 is rotationally supported in the manual transmission 10 by tapered roller bearings 54 and 56. The output shaft 20 is rotationally supported in the manual transmission 10 by tapered roller bearings 58 and 60. The rear end 52 of the input shaft 14 is rotationally unrestrained by the output shaft recessed end 50. However, a biasing member 62 is axially disposed between the input shaft 14 and the output shaft 20 that provides a longitudinally directed biasing force. In this manner, the biasing member 62 causes a predetermined, or pre-loaded, thrust force to be placed upon the roller bearings 54 through 60. In one embodiment, the biasing member 62 is a Belleville spring.

In a similar manner, the countershaft 18 is rotationally supported in the manual transmission 10 by tapered roller bearings 64 and 66. A biasing member 68 is axially disposed between the rear end 70 of the countershaft 18 and the transmission case 12 that provides a longitudinally directed biasing force. The biasing member 68 causes a predetermined, or pre-loaded, thrust force to be placed upon the roller bearings 64 and 66. In one embodiment, the biasing member 68 is a Belleville spring.

The secondary shaft 22 is axially parallel to the input shaft 14 and the countershaft 18. The secondary shaft 22 has a second reverse/power takeoff gear 76 in meshing engagement with the first reverse/power take-off gear 40 of the input shaft 14. The secondary shaft 22 also includes a reverse idler gear 78 in meshing engagement with the reverse output gear 44 of the countershaft 18. It should be appreciated that the engagement and angular relationship between the input shaft 14, the countershaft 18, and the secondary shaft 22 is illustrated in FIG. 1.

The secondary shaft 22 functions as a counter-rotating intermediate shaft between the input shaft 14 and the countershaft 18 to selectively cause the countershaft 18 and the output shaft 20 to rotate in the reverse direction from that of the six forward gears. Additionally, the secondary shaft 22 provides a rotational output that serves as a power take-off, generally indicated at 80, that may serve as a source of motive power for any number of various power driven attachments and accessories that may be connected to the manual transmission 10 or the vehicle.

Operationally, the engagement and disengagement of the various forward and reverse gears is accomplished by the selective actuation of each of the plurality of synchronizers 24 within the manual transmission 10. As illustrated in FIG. 2, there are three synchronizers 84, 86, and 88 that are utilized to shift through the six forward gears and reverse. It should be appreciated that they are a variety of known types of synchronizers that are capable of engaging a gear to a shaft. In the embodiment illustrated, the synchronizers 24 are of the type generally known as single cone synchronizers.

Additionally, as illustrated in FIG. 1, the synchronizers 24 are two sided, dual actuated synchronizers, such that they operatively engage one gear to its shaft when longitudinally moved off of a center neutralized position to the right and engage another gear to its shaft when longitudinally moved off the center neutralized position to the left. For example, to engage first gear, synchronizer 84 is moved forward, or to the left as illustrated in FIG. 2, to cause the gear 30B of the first gear set pair 30 to be engaged to the countershaft 18. The other synchronizers 24 remain centered, or neutralized while the first gear set pair 30 is engaged. It should be appreciated that the synchronizers 24 may be operatively controlled by any number of physical devices beyond the scope of the present invention. However, a shifter fork arrangement on one or more shifter rails (not shown) is preferred. An example of a shifter fork arrangement or shifter assembly for use with the manual transmission 10 is disclosed in copending application Ser. No. 11/139,721, filed May 27, 2005, the disclosure of which is hereby incorporated by reference.

In operation, when the manual transmission 10 is in first gear, the gear 30A is engaged with the gear 30B of the first gear set pair 30 to rotate the counter shaft 18. When it is desired to shift the manual transmission 10 from first to second gear, the synchronizer 84 on the countershaft 18 is moved rearward, or right as illustrated in FIG. 2, to cause gear 30B of the first gear set pair 30 to be disengaged. The synchronizer 84 will continue to be moved to the right through the centered, or neutralized position to cause the gear 32B of the second gear set pair 32 to be engaged with the gear 32A to rotate the countershaft 18.

When it is desired to shift the manual transmission 10 from second to third gear, the synchronizer 84 is moved to the left to cause gear 32B of the second gear set pair 32 to be disengaged. The synchronizer 84 will stop at the centered or neutralized position. Then, the synchronizer 86 on the input shaft 14 is moved right to cause gear 34B of the third gear set pair 34 to be engaged with the gear 34A to rotate the counter shaft 18. When it is desired to further shift the transmission 10 from third to fourth gear, the synchronizer 86 is moved left to cause gear 34B of the third gear set pair 34 to be disengaged. The synchronizer 86 will continue to be moved to the left through the centered or neutralized position to cause the gear 36B of the fourth gear set pair 36 to be engaged with the gear 36A to rotate the counter shaft 18.

When it is further desired to shift the transmission 10 from fourth to fifth gear, the synchronizer 86 is moved to the right to cause gear 36B of the fourth gear set pair 36 to be disengaged. The synchronizer 86 will stop at the centered, or neutralized position. Then, the synchronizer 88 on the input shaft 14 is moved to the right to engage the input shaft 14 directly to the output shaft 20 at the second output gear 46. As previously described, fifth gear is a direct or one-to-one gear ratio and is a direct connection between the input and output shafts 14 and 18, respectively.

When it is desired to shift the transmission 10 from fifth to sixth gear, the synchronizer 88 is moved left to cause the input shaft 14 to be disengaged from the output shaft 18. The synchronizer 88 will continue left through the centered or neutralized position to cause the gear 38B of the sixth gear set pair 38 to be engaged with the gear 38A to rotate the counter shaft 18. It should be appreciated that rotation of the countershaft 18 rotates the first output gear 42, which, in turn, rotates the second output gear 46 of the output shaft 20, providing the output torque to the remainder of the powertrain.

The secondary shaft 22 provides reverse gear and a power take-off, the first reverse/power take-off gear 40 is fixedly mounted to the input shaft 14 and the second reverse/power take-off gear 76 is fixedly mounted to the secondary shaft 22. In this manner, as long as the input shaft 14 is rotating, the power take-off connection at 80 is providing rotational output.

The reverse idler gear 78 is fixedly mounted to the secondary shaft 22 and the reverse output gear 44 is adapted to be freely rotatable about the countershaft 18. It should be appreciated that a synchronizer may be used to engage the reverse output gear 44 to the countershaft 18. However, this adds additional components, weight, and cost, and it is generally unnecessary to synchronize the reverse gear to its shaft. Thus, in the embodiment illustrated, the reverse gear 44 includes female gear or spline teeth 90 and the countershaft 18 includes a cooperative set of male gear or spline teeth 92. When it is desired to shift the transmission 10 into reverse, the reverse output gear 44 on the countershaft 18 is moved to the right to cause the gear or spline teeth 90 to engage the gear or spline teeth 92. In this manner, the input shaft 14 is coupled first to the secondary shaft 22 and then to the countershaft 18. Thus, the rotational movement of the input shaft 14 and secondary shaft 22 cause the countershaft 18 and output shaft 20 to rotate in the reverse direction from that of the forward gear sets.

Thus, the manual transmission 10 of the present invention provides the advantage of all the driver gears on the input shaft to take only engine torque, allowing for reduced loads on the driver gears and smaller driver gear size with quieter operation. The manual transmission 10 also has synchronizers disposed on both the input shaft and the countershaft, allowing for shorter shafts that are properly supported within the transmission case 12 and reducing the number of parts, size, and weight of the transmission 10. The manual transmission 10 provides the advantage of the having a secondary shaft that provides both the power take-off output and the reverse gear for the transmission 10, again reducing the number of parts, size, and weight of the transmission 10. The manual transmission 10 of the present invention has the input shaft and the output shaft coaxial, which allows the size of the transmission 10 to be further reduced and additionally allows for a simple direct one-to-one ratio coupling for one of the forward gears with a minimum of component parts. Further, the overall reduction in the number of components and reduction in the size, and weight of the manual transmission 10 is cost efficient.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A manual transmission comprising:
an input shaft operatively connected to a source of motive power and having a first reverse/power take-off gear;
a countershaft having a first output gear and a reverse output gear, said countershaft being in axially parallel relationship with said input shaft;
a plurality of meshingly engaged gear set pairs, each gear set pair including a first gear and a second gear, said gear set pairs disposed upon said input shaft and said counter shaft, said first gear of each said gear set pair fixedly mounted to its respective shaft and said second gear of each said gear set pair adapted to rotate freely about its respective shaft;

a plurality of synchronizers disposed upon said input shaft and said countershaft, each said synchronizer adapted to selectively engage said freely rotatable gear of each said gear set pair to its respective shaft;

an output shaft in axial parallel relationship with said countershaft and having a second output gear in meshing engagement with said first output gear of said countershaft, said input shaft and said output shaft being rotationally supported by a plurality of tapered bearings, and being coaxially disposed and end abutting within said transmission;

a biasing member operatively disposed between said abutting ends of said input shaft and said output shaft such that said biasing member preloads said bearings with a predetermined axial thrust; and a secondary shaft axially parallel to said input shaft and said countershaft, said secondary shaft substantially encompassed by a case, but having an end extending through said case, said secondary shaft having a second reverse/power takeoff gear in meshing engagement with said first reverse/power take-off gear of said input shaft, and a reverse idler gear in meshing engagement with said reverse output gear of said countershaft, said end of said secondary shaft which extends through said case being equipped with a rotational output which serves as a source of motive power.

2. A manual transmission as set forth in claim 1 wherein said first reverse/power take-off gear is fixedly mounted to said input shaft, said second reverse/power takeoff gear is fixedly mounted to said secondary shaft, said reverse idler gear is fixedly mounted to said secondary shaft, and there is a splined connection between said reverse output gear and said countershaft.

3. A manual transmission as set forth in claim 1 wherein said biasing member is a Bellville spring.

4. A manual transmission as set forth in claim 1 wherein said countershaft is rotationally supported by a plurality of tapered bearings within said transmission, said transmission further including a biasing member operatively disposed at one end of said countershaft such that said biasing member preloads said bearings with a predetermined axial thrust.

5. A manual transmission as set forth in claim 4 wherein said biasing member is a Bellville spring.

6. A manual transmission as set forth in claim 1 wherein each of said synchronizers is a single cone synchronizer.

7. A manual transmission comprising:

an input shaft operatively connected to a source of motive power and having a first reverse/power take-off gear, a countershaft having a fixedly mounted first output gear and a reverse output gear adapted to selectively engage and disengage from said countershaft, said countershaft being in axially parallel relationship with said input shaft;

a plurality of meshingly engaged gear set pairs, each gear set pair including a first gear and a second gear, said gear set pairs being disposed upon said input shaft and said counter shaft, said first gear of each said gear set pair being fixedly mounted to its respective shaft and said second gear of each said gear set pair being adapted to rotate freely about its respective shaft;

a plurality of synchronizers disposed upon said input shaft and said countershaft, each said synchronizer being adapted to selectively engage said freely rotatable gear of each said gear set pair to its respective shaft;

an output shaft in axial parallel relationship with said countershaft and having a fixedly mounted second output gear in meshing engagement with said first output gear of said countershaft, said input shaft and said output shaft being rotationally supported by a plurality of tapered bearings, and being coaxially disposed and end abutting within said transmission;

a secondary shaft axially parallel to said input shaft and said countershaft, said secondary shaft substantially encompassed by a case, but having an end extending through said case, said secondary shaft having a second fixedly mounted reverse/power takeoff gear in meshing engagement with said first reverse/power take-off gear of said input shaft, and a fixedly mounted reverse idler gear in meshing engagement with said reverse output gear of said countershaft, said end of said secondary shaft which extends through said case being equipped with a rotational output which serves as a source of motive power; and a biasing member operatively disposed between said abutting ends of said input shaft and said output shaft such that said biasing member preloads said bearings with a predetermined axial thrust.

8. A manual transmission as set forth in claim 7 wherein said biasing member is a Bellville spring.

9. A manual transmission as set forth in claim 7 wherein said countershaft is rotationally supported by a plurality of tapered bearings within said transmission, said transmission further including a biasing member operatively disposed at one end of said countershaft such that said biasing member preloads said bearings with a predetermined axial thrust.

10. A manual transmission as set forth in claim 9 wherein said biasing member is a Bellville spring.

11. A manual transmission as set forth in claim 7 wherein each of said synchronizers is a single cone synchronizer.

12. A manual transmission comprising:

an input shaft operatively connected to a source of motive power and including a first fixedly mounted reverse/power take-off gear;

a countershaft having a fixedly mounted first output gear and a reverse output gear, said countershaft being in axially parallel relationship with said input shaft;

a plurality of meshingly engaged gear set pairs, each gear set pair including a first gear and a second gear, said gear set pairs disposed upon said input shaft and said counter shaft, said first gear of each said gear set pair being fixedly mounted to its respective shaft and said second gear of each said gear set pair being adapted to rotate freely about its respective shaft;

a plurality of synchronizers disposed upon said input shaft and said countershaft, each said synchronizer adapted to selectively engage said freely rotatable gear of each said gear set pair to its respective shaft;

an output shaft in axial parallel relationship with said countershaft and a fixedly mounted second output gear in meshing engagement with said first output gear of said countershaft, said input shaft and said output shaft being rotationally supported by a plurality of tapered bearings, and being coaxially disposed and end abutting within said transmission;

a biasing member operatively disposed between said abutting ends of said input shaft and said output shaft such that said biasing member preloads said bearings with a predetermined axial thrust;

a secondary shaft axially parallel to said input shaft and said countershaft, said secondary shaft substantially encompassed by a case, but having an end extending through said case, said secondary shaft having a second fixedly mounted reverse/power takeoff gear in meshing engagement with said first reverse/power take-off gear of said input shaft, and a fixedly mounted reverse idler gear in meshing engagement with said reverse output gear of said countershaft, said end of said secondary shaft which extends through said case being equipped with a rotational output which serves as a source of motive power; and a splined connection between said countershaft and said reverse output gear.

13. A manual transmission as set forth in claim 12 wherein said biasing member is a Bellville spring.

14. A manual transmission as set forth in claim 12 wherein said countershaft is rotationally supported by a plurality of tapered bearings within said transmission, said transmission further including a biasing member operatively disposed at one end of said countershaft such that said biasing member preloads said bearings with a predetermined axial thrust.

15. A manual transmission as set forth in claim 14 wherein said biasing member is a Bellville spring.

16. A manual transmission as set forth in claim 12 wherein each of said synchronizers is a single cone synchronizer.

\* \* \* \* \*